US012761585B2

(12) United States Patent
Hirayanagi et al.

(10) Patent No.: US 12,761,585 B2
(45) Date of Patent: Oct. 13, 2026

(54) ELECTROPHOTOGRAPHIC BELT AND ELECTROPHOTOGRAPHIC IMAGE FORMING APPARATUS

(71) Applicant: CANON KABUSHIKI KAISHA, Tokyo (JP)

(72) Inventors: Tomoe Hirayanagi, Saitama (JP); Masatsugu Toyonori, Kanagawa (JP); Hiroomi Kojima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 18/826,519

(22) Filed: Sep. 6, 2024

(65) Prior Publication Data

US 2025/0093798 A1 Mar. 20, 2025

(30) Foreign Application Priority Data

Sep. 15, 2023 (JP) ................................. 2023-150497

(51) Int. Cl.
*G03G 15/16* (2006.01)

(52) U.S. Cl.
CPC ....... *G03G 15/162* (2013.01); *G03G 15/1685* (2013.01); *G03G 2215/1623* (2013.01)

(58) Field of Classification Search
CPC ............. G03G 15/162; G03G 15/1685; G03G 2215/1623
See application file for complete search history.

(56) References Cited

U.S. PATENT DOCUMENTS

| | | | | |
|---|---|---|---|---|
| 9,753,411 | B2 | 9/2017 | Uchida et al. | |
| 10,866,543 | B2 | 12/2020 | Hamana et al. | |
| 11,435,680 | B2 | 9/2022 | Ishio et al. | |
| 11,586,132 | B2 | 2/2023 | Kojima | |
| 11,656,564 | B2 | 5/2023 | Ishio et al. | |
| 11,803,136 | B2 | 10/2023 | Kojima | |
| 11,906,913 | B2 | 2/2024 | Hamana et al. | |
| 11,971,669 | B2 | 4/2024 | Kojima | |
| 2007/0282051 | A1* | 12/2007 | Okano | G03G 15/162 524/495 |
| 2020/0363756 | A1* | 11/2020 | Hamana | G03G 15/162 |
| 2022/0365464 | A1* | 11/2022 | Kameyama | G03G 5/14726 |
| 2024/0219861 | A1 | 7/2024 | Kojima | |
| 2025/0093798 | A1* | 3/2025 | Hirayanagi | G03G 15/162 |

FOREIGN PATENT DOCUMENTS

| | | | |
|---|---|---|---|
| JP | 9-211934 | A | 8/1997 |
| JP | 2010-54942 | A | 3/2010 |
| JP | 2020-190720 | A | 11/2020 |
| JP | 2021-67942 | A | 4/2021 |
| JP | 2022-77928 | A | 5/2022 |

OTHER PUBLICATIONS

Kojima, U.S. Appl. No. 18/918,203, filed Oct. 17, 2024.

* cited by examiner

*Primary Examiner* — Blaine Copenheaver
(74) *Attorney, Agent, or Firm* — Venable LLP

(57) ABSTRACT

An electrophotographic belt is provided, which includes a base layer having an endless shape, and a conductive layer in contact with the base layer, wherein the base layer contains a crystalline polyester, the conductive layer contains a crosslinked polyester urethane having a triazine ring in a molecule, and when 8 square observation regions each having a side length of 2.5 mm are placed in a circumferential direction of the electrophotographic belt, at least 6 observation regions among the 8 observation regions have a coefficient of variation of nanoindentation hardness of not more than 0.25.

11 Claims, 4 Drawing Sheets

ELECTROPHOTOGRAPHIC BELT AND ELECTROPHOTOGRAPHIC IMAGE FORMING APPARATUS

BACKGROUND OF THE INVENTION

Field of the Invention

The present disclosure relates to an electrophotographic belt and an electrophotographic image forming apparatus including the electrophotographic belt.

Description of the Related Art

In an electrophotographic image forming apparatus (hereinafter, also referred to as an "electrophotographic apparatus"), an electrostatic charge image bearing member such as a photosensitive drum is charged, and the charged electrostatic charge image bearing member is exposed so as to form an electrostatic latent image. Thereafter, the electrostatic latent image is developed by a triboelectrical charged toner, and the toner image is transferred and fixed to a recording medium such as paper, thereby forming a desired image on the recording medium.

As a transfer method of the electrophotographic apparatus, there is known an intermediate transfer method in which an unfixed toner image on an electrostatic charge image bearing member such as a photosensitive drum is primarily transferred to an intermediate transfer body by a current supplied from a transfer power supply, and then the unfixed toner image is secondarily transferred from the intermediate transfer body to a recording medium. A transfer power supply is installed in each of the primary transfer and the secondary transfer, and control is implemented to attain an optimum current value according to the surrounding environment (temperature and humidity) and the recording medium type. Such an intermediate transfer method is particularly adopted in a color electrophotographic apparatus.

In a color electrophotographic apparatus, toners of four colors (yellow, magenta, cyan, and black) are sequentially transferred from an image forming unit of each color onto an intermediate transfer member, and the obtained composite images are collectively transferred to a recording medium, so that there are advantages that printing is speeded up and a high-quality image is obtained.

In recent years, it has been studied to reduce the number of parts in accordance with an increasing need for miniaturization and for cost reduction of copiers and printers. Specifically, as described in Japanese Patent Application Publication No. 2020-190720, an intermediate transfer belt including a base layer containing an endless crystalline polyester and a conductive layer formed on an inner peripheral surface of the base layer has been proposed. Japanese Patent Application Publication No. 2020-190720 indicates that, when a large amount of an electron conductive agent is contained in a conductive layer in order to enhance the conductivity of the conductive layer, a problem arises in that adhesiveness between the conductive layer and a base layer is deteriorated. Japanese Patent Application Publication No. 2020-190720 discloses that the above problem can be solved by including a polyester resin having two monomer units derived from fumaric acid in the conductive layer.

SUMMARY OF THE INVENTION

The inner peripheral surface of the intermediate transfer belt is required to have high durability because a roller for rotating the intermediate transfer belt contacts on the inner peripheral surface. Specifically, for example, also in a case where electrophotographic images are formed for a long period of time, it is required that wear and cracks of the conductive layer do not occur. According to the study of the present inventors, it has been recognized that the electrophotographic belt according to Japanese Patent Application Publication No. 2020-190720 requires further improvement in durability in long-term use.

Here, Japanese Patent Application Publication No. H09-211934 discloses that the hardness is increased by crosslinking a polyester resin with a melamine crosslinking agent. Therefore, the present inventors have attempted to crosslink the polyester in the conductive layer with a melamine crosslinking agent in order to further improve the abrasion resistance of the conductive layer. However, when the obtained electrophotographic belt is used for formation of electrophotographic images, cracks occurred sometimes in the resin layer relatively early.

At least one aspect of the present disclosure is directed to providing an electrophotographic belt including a resin layer that is less likely to become worn and cracked on an inner peripheral surface even after long-term use. In addition, at least one aspect of the present disclosure is directed to providing an electrophotographic image forming apparatus capable of stably forming a high-quality electrophotographic image.

At least one aspect of the present disclosure provides an electrophotographic belt having an endless shape, the electrophotographic belt comprising:

a base layer having an endless shape; and a conductive layer in contact with the base layer, wherein the base layer comprises a crystalline polyester, the conductive layer comprises a crosslinked polyester urethane, the crosslinked polyester urethane has a triazine ring in a molecule, and when a length in a width direction orthogonal to a circumferential direction of the electrophotographic belt is W, and a region of W/4 from a midpoint in the width direction toward both ends in the width direction is a central region, when eight observation regions of a square having a side length of 2.5 mm are placed in the circumferential direction of the electrophotographic belt in the central region of an outer surface of the conductive layer opposite to a surface facing the base layer such that one side of the square is parallel to the width direction, at least six of the eight observation regions satisfy conditions below:

<Conditions> when the observation region is divided equally by four straight lines parallel to one side of the observation region and four straight lines orthogonal to the straight lines, at 16 intersection points of these straight lines, a coefficient of variation of the nanoindentation hardness measured under an environment at a temperature of 25° C. is not more than 0.25.

Also, at least one aspect of the present disclosure is directed to providing an electrophotographic image forming apparatus, comprising the above electrophotographic belt as an intermediate transfer belt.

At least one aspect of the present disclosure can provide an electrophotographic belt including a resin layer that is less likely to become worn and cracked on an inner peripheral surface even after long-term use. In addition, at least one aspect of the present disclosure can provide an electrophotographic image forming apparatus capable of stably forming a high-quality electrophotographic image.

Further features of the present invention will become apparent from the following description of exemplary embodiments with reference to the attached drawings.

DESCRIPTION OF THE EMBODIMENTS

Figure 1A:
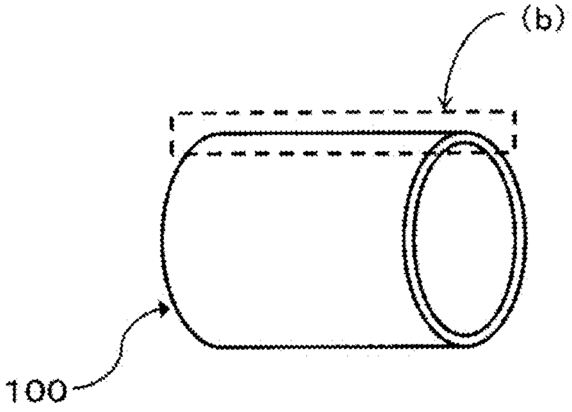
FIGS. 1A and 1B are schematic views of an electrophotographic belt according to the present disclosure.

In the present disclosure, "from XX to YY" or "XX to YY" indicating a numerical range means a numerical range including a lower limit and an upper limit that are end points unless otherwise specified. When the numerical ranges are described in stages, the upper limits and the lower limits of each numerical range can be arbitrarily combined. In the present disclosure, for example, description such as "at least one selected from the group consisting of XX, YY, and ZZ" means any of XX, YY, ZZ, a combination of XX and YY, a combination of XX and ZZ, a combination of YY and ZZ, or a combination of XX, YY and ZZ. In the present disclosure, the unit "Q/u" of the surface resistivity means "Q/square."

As described above, the present inventors have attempted to crosslink a polyester in a conductive layer with a melamine crosslinking agent in order to improve the abrasion resistance of the conductive layer. However, when the obtained electrophotographic belt is used for formation of electrophotographic images, cracks may occur in the resin layer relatively early. In addition, in a case where a biaxially stretched cylindrical film was used as the base layer, the occurrence of cracks was more pronounced. Therefore, the present inventors have studied the cause of occurrence of cracks. As a result, it was theorized that the cracks were generated by the following mechanism.

That is, the conductive layer of the electrophotographic belt obtained above is a cured film of a coating film of a coating material for forming a conductive layer (hereinafter, may be simply referred to as "coating material") containing a polyester urethane and a melamine crosslinking agent formed on the inner peripheral surface of the base layer containing a crystalline polyester. When such a cured film is formed, it is necessary to heat the coating film to a temperature of 150° C. or higher in order to promote the reaction between the polyester urethane and the melamine crosslinking agent in the coating film. Such a temperature exceeds the glass transition temperature of the crystalline polyester in the base layer. Therefore, the base layer is shrunk by heat necessary for curing the coating film (formation of the conductive layer). Then, in the curing process, the coating film is cured while being shrunk following the shrinkage of the base layer. Therefore, a portion having a relatively high density and a portion having a relatively low density are generated inside the obtained conductive layer.

Since a portion having a high density has high hardness and a portion having a low density has low hardness, hardness unevenness occurs inside the conductive layer. It is considered that when the electrophotographic belt having such a conductive layer is mounted in an electrophotographic apparatus and rotated, stress concentrates on a portion where hardness of the conductive layer is low, and cracks may be generated. The biaxially stretched cylindrical film shrinks more when heated. Therefore, it is considered that when a biaxially stretched cylindrical film was used for the base layer, generation of cracks was observed more pronouncedly.

Based on such considerations, the present inventors have obtained recognition that it is important to suppress unevenness in hardness of the conductive layer, which is a hard film of a coating film of a coating material containing a polyester urethane and a melamine crosslinking agent, in order to achieve both abrasion resistance and crack resistance of the conductive layer at a high level when the electrophotographic belt is used for a long period of time.

Based on such recognition, as a result of further studies, the present inventors have found that an electrophotographic belt having the following configuration achieves both abrasion resistance and crack resistance at a high level.

That is, an electrophotographic belt according to an aspect of the present disclosure includes a base layer having an endless shape, and a conductive layer in contact with the base layer. The base layer contains a crystalline polyester, the conductive layer contains a crosslinked polyester urethane, and the crosslinked polyester urethane has a triazine ring in a molecule. Then, when a length in a width direction orthogonal to the circumferential direction of the electrophotographic belt is W, and a region of W/4 from a midpoint in the width direction toward both ends in the width direction is defined as a central region. And, when eight observation regions of square having a side length of 2.5 mm are placed in the circumferential direction of the electrophotographic belt in the central region of an outer surface opposite to a surface of the conductive layer facing the base layer such that one side of the square is parallel to the width direction, at least six of the eight observation regions satisfy the following conditions.

Conditions

The square region is divided equally by four straight lines parallel to one side and four straight lines perpendicular to these lines, and at 16 intersections of these straight lines, the coefficient of variation in the nanoindentation hardness measured under an environment at a temperature of 25° C. is 0.25 or less.

Since the coefficient of variation when the nanoindentation hardness is measured at intervals of 0.5 mm is 0.25 or less in a square observation region of 2.5 mm square on the outer surface of the conductive layer, a stress concentration portion that becomes a starting point of cracks is less likely to occur in the observation region. Then, when eight observation regions are placed in the central region of the outer surface of the conductive layer not to overlap each other in the circumferential direction of the electrophotographic belt, at least six, preferably at least seven, more preferably eight observation regions among the eight observation regions satisfy the above Conditions, so that stress concentration points that become starting points of cracks are less likely to occur in the conductive layer, and cracks can be prevented from occurring in the conductive layer even after long-term use.

Figure 3:
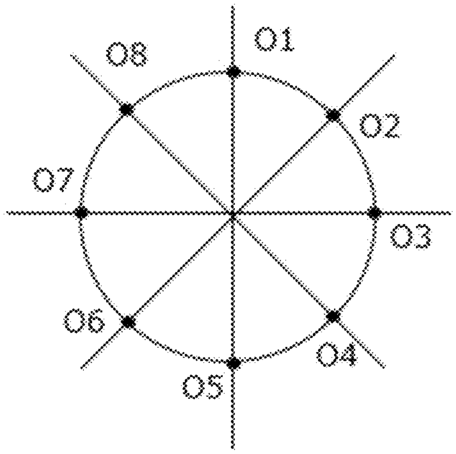
FIG. 3 is an explanatory view of an arrangement position of an observation region of a conductive layer.

The arrangement positions of the eight observation regions in the central region of the outer surface of the conductive layer are not particularly limited as long as they are in the circumferential direction of the electrophotographic belt and do not overlap each other. When it is assumed that the cross section parallel to the circumferential direction of the electrophotographic belt is a perfect circle, as illustrated in FIG. 3, the observation region is preferably equally arranged at positions of a point O2 of 45 degrees, an O3 of 90 degrees, an O4 of 135 degrees, an O5 of 180 degrees, an O6 of 225 degrees, an O7 of 270 degrees, and an O8 of 315 degrees clockwise from the point O1. This is because in this case it is possible to ascertain whether there is unevenness in the hardness over the entire electrophotographic belt in the circumferential direction.

Means for setting the coefficient of variation of the nanoindentation hardness of the conductive layer within the above range is not particularly limited, but may be for forming a conductive layer. For example, the present inventors have found that when the melamine crosslinking agent and the polyester urethane are crosslinked, the shrinkage of the base layer is easily suppressed by pressurizing the melamine crosslinking agent and the polyester urethane simultaneously with heating. As a result, shrinkage of the conductive layer can also be suppressed, the coefficient of variation of the nanoindentation hardness can be easily set to the above range, and the density difference of the conductive layer formed on the base layer is less likely to occur, whereby the hardness unevenness of the conductive layer is suppressed.

The present inventors consider the reason for this to be as follows. When heated to the glass transition temperature or higher, the crystalline polyester is crystallized and shrunk. On the other hand, when heating is performed while applying pressure, the amorphous molecules of the crystalline polyester are stretched, and thus the base layer barely shrinks. Therefore, the conductive layer does not shrink, the coefficient of variation of the nanoindentation hardness is easily set to the above range, and the hardness unevenness can be suppressed.

The coefficient of variation of the nanoindentation hardness is preferably 0.20 or less, and more preferably 0.19 or less. The lower limit is not particularly limited, but is, for example, 0.00 or more. A preferable range of the coefficient of variation of the nanoindentation hardness is, for example, 0.00 to 0.20, and particularly 0.07 to 0.19. As described above, the coefficient of variation of the nanoindentation hardness can be reduced by suppressing shrinkage of the base layer due to heat in the curing process of the coating film of the coating material for forming the conductive layer, specifically, for example, by suppressing shrinkage of the base layer by applying pressure to the base layer in the forming process of the conductive layer.

In the measurement of the nanoindentation hardness, it is preferable to use a Berkovich indenter and use a measured value in a region of 2 to 10% in the thickness (film thickness) direction from the outermost surface of the conductive layer, that is, the surface of the conductive layer opposite to the surface facing the base layer. A region of 2% to 10% of the film thickness of the conductive layer near the outermost surface is hardly affected by a measurement environment such as vibration of an indenter. In addition, since it is hardly affected by the base layer, the hardness of the conductive layer itself can be more accurately evaluated.

Hereinafter, an embodiment of an electrophotographic belt according to the present disclosure will be described in detail. Note that the present disclosure is not limited to the following embodiments.

Electrophotographic Belt

Hereinafter, the electrophotographic belt according to the present aspect will be described in detail.

Figure 1B:
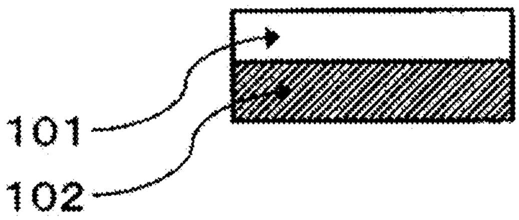

FIG. 1A is a perspective view of an electrophotographic belt having an endless shape. FIG. 1B is an enlarged view of an axial cross section (a cross section taken along line (b)) of FIG. 1A. An electrophotographic belt 100 illustrated in FIGS. 1A and 1B has a laminate of a base layer 101 and a conductive layer 102. The conductive layer 102 exists on the inner peripheral surface side of the base layer 101, and the conductive layer 102 is exposed on the inner peripheral surface of the electrophotographic belt. Although not illustrated, a surface layer (outermost layer) in contact with the photosensitive drum or another member may be provided on the outer peripheral surface of the base layer 101. In a case where the electrophotographic belt is an intermediate transfer belt, the number of transfer power supplies can be reduced as described later since the conductive layer 102 is present on the inner peripheral surface side of the base layer 101.

By connecting a voltage maintaining element such as a Zener diode to the conductive layer 102 in FIGS. 1A and 1B via a member in contact with the conductive layer, the potential of the conductive layer can be made constant. As a result, a desired current can flow to all the photosensitive drums through the conductive layer, and the electrophotographic belt can be used in an image forming apparatus capable of performing not only secondary transfer but also primary transfer with one transfer power supply.

The electrophotographic belt has an endless belt shape. The electrophotographic belt can be used by being stretched by a plurality of rollers. The endless belt shape refers to, for example, a shape obtained by connecting a sheet or a film-shaped molded product in a cylindrical shape, and refers to a shape that can be stretched and rotated by a plurality of rollers. Among the endless belt shapes, a seamless shape having no joint (seam) is preferable from the viewpoint of reducing the thickness unevenness of the belt.

Since the electrophotographic belt is used in the above-described image forming apparatus with reduced size and cost, the volume resistivity measured in a normal temperature and normal humidity environment (temperature: 23° C., humidity: 50%) is preferably in the range of $1\times10^8$ to $1\times10^{11}$ Ω·cm.

In addition, the electrophotographic belt is preferably an electrophotographic belt in which the surface resistivity on the inner peripheral surface side is smaller than the surface resistivity on the outer peripheral surface side, and the surface resistivity measured from the inner peripheral surface side is in the range of $1.0\times10^7$ Ω/□ or less. In a case where the surface resistivity is high, a transfer voltage necessary for primarily transferring the photosensitive drum-shaped toner image to the transfer belt is insufficient, and image defects such as transfer omission may occur.

Next, a configuration material and a forming method of each layer of the electrophotographic belt will be described in detail. The method for producing the electrophotographic belt is not particularly limited.

Base Layer Material

The base layer having an endless shape according to an aspect of the present disclosure contains a crystalline polyester, and preferably contains a crystalline polyester and a conductive agent. In addition, additives such as a plasticizer, an antioxidant, a decomposition inhibitor, a roughness modifier, a filler, and an elastomer can be added as necessary. First, the crystalline polyester will be described.

The crystalline polyester as a raw material can be obtained from a polycondensate of a dicarboxylic acid and a diol, a polycondensate of an oxycarboxylic acid or a lactone, a polycondensate using a plurality of these components, or the like. Additional polyfunctional monomers may be used in combination. The crystalline polyester may be a homopolyester containing one kind of ester bond or a copolyester (copolymer) containing a plurality of ester bonds. As the crystalline polyester, a crystalline polyester having an aromatic ring in the molecule, which can have higher crystallinity, can be suitably used.

Examples of the crystalline polyester include polyalkylene terephthalate and polyalkylene naphthalate which have high crystallinity and exhibit excellent heat resistance; copolymer of polyalkylene terephthalate and polyalkylene naphthalate, and copolymer of polyalkylene naphthalate and polyalkylene isophthalate; and at least one crystalline polyester selected from the group consisting of polyesters obtained by modifying some of these blocks with other blocks. The crystalline polyester is more preferably at least one crystalline polyester selected from the group consisting of polyalkylene terephthalate and polyalkylene naphthalate. Such a polyester is more likely to achieve low cost.

The number of carbon atoms of the alkylene in the polyalkylene terephthalate, the polyalkylene naphthalate, and the polyalkylene isophthalate is preferably 2 to 16 (more preferably 2 to 4) from the viewpoint that high crystallinity and heat resistance can be obtained. More specifically, the crystalline polyester is preferably at least one crystalline polyester selected from the group consisting of polyethylene terephthalate, polyethylene naphthalate, and polyethylene isophthalate, and modified polyethylene terephthalate obtained by modifying some of these blocks with other blocks, modified polyethylene naphthalate, and modified polyethylene isophthalate. The crystalline polyester more preferably contains at least one selected from the group consisting of polyethylene terephthalate and polyethylene naphthalate, and still more preferably contains polyethylene naphthalate.

Examples of the other block include a monomer unit formed of at least one compound selected from the group consisting of 1,4-naphthalenedicarboxylic acid and 2,3-naphthalenedicarboxylic acid. These compounds can be used singly or in combination of two or more kinds thereof. It may be a blend or an alloy, and other resins may be added.

Next, the conductive agent will be described.

In the base layer, an ionic conducting agent can be used as the conductive agent. Examples of the ionic conducting agent include at least one selected from the group consisting of a low molecular ionic conducting agent such as an ionic liquid and a polymer ionic conducting agent such as polyether ester amide. The ionic conducting agent preferably contains an ionic liquid and a polyether ester amide.

The ionic liquid is a salt composed only of a cation and an anion, and generally takes a liquid state at normal temperature. As the cation, an alkali metal cation, an imidazolium cation, an alkylammonium cation, an alkylphosphonium cation and a derivative thereof, and the like can be used.

As the anion, a sulfonate ion, a carboxylate ion, a phosphinate ion, or the like can be used. In addition, examples thereof include $F^-$, $Cl^-$, $Br^-$, $I^-$, $AlCl_4^-$, and $N(CN)_2^-$.

Examples of the polyether ester amide include compounds containing, as a main component, a copolymer composed of a polyamide block unit and a polyether ester unit, such as nylon 6, nylon 66, nylon 11, and nylon 12. Examples thereof include copolymers derived from lactam or an aminocarboxylate, polyethylene glycol, and a dicarboxylic acid such as terephthalic acid or isophthalic acid.

Method for Forming Base Layer

The base layer can be formed, for example, by the following method. For example, it can be formed by the method described in Japanese Patent Application Publication No. 2010-054942. First, a crystalline polyester, a conductive agent, and an additive as necessary are mixed, and melt-kneaded (for example, at 190 to 270° C., for example, for 3 to 5 minutes.) using a kneading apparatus or the like to prepare a conductive resin composition. Next, a preform of a conductive resin composition having a test tube shape is produced by injection molding. The preform is subjected to stretch blow molding in the longitudinal direction and the circumferential direction to obtain a blow bottle of the conductive resin composition. A conductive film (biaxially stretched cylindrical film) stretched in the circumferential direction and the longitudinal direction and having an endless shape can be obtained from the blow bottle.

The base layer preferably has a biaxially stretched cylindrical film. In the biaxially stretched cylindrical film, when the crystalline polyester is stretched in the longitudinal direction and the circumferential direction of the preform, crystals are oriented in each direction, and the crystalline polyester has excellent strength. Both the tensile modulus Ep of the cylindrical film in the circumferential direction and the tensile modulus Ea of the cylindrical film in the direction orthogonal to the circumferential direction are preferably 1000 MPa or more.

The electrophotographic belt is stretched by a plurality of rollers with a predetermined tension in the electrophotographic image forming apparatus, but elongation and breakage can be prevented by setting Ep to 1000 MPa or more. In addition, by applying a predetermined tension in the circumferential direction, a compressive force is applied in a direction orthogonal to the circumferential direction of the electrophotographic belt. However, by setting Ea to 1000 MPa or more, it is possible to more reliably suppress generation of wrinkles along the circumferential direction on the outer surface of the electrophotographic belt due to the compressive force.

The tensile elastic modulus described above can be controlled by the degree of orientation of the crystalline polyester in the circumferential direction of the cylindrical film and the direction orthogonal to the circumferential direction. The degree of orientation of the crystalline polyester can be expressed by the shrinkage ratio $\alpha p$ in the circumferential direction of the cylindrical film and the shrinkage ratio $\alpha a$ in the direction (axial direction) orthogonal to the circumferential direction. Both $\alpha p$ and $\alpha a$ of the cylindrical film are preferably 2.0% or more. In the cylindrical film in which $\alpha p$ and $\alpha a$ are 2.0% or more, the crystalline polyester is sufficiently oriented in the circumferential direction and the direction orthogonal to the circumferential direction, which means that the deformation of the belt can be suppressed by the action of the shrinkage stress when the belt is tensile-stretched. The cylindrical film having such a shrinkage ratio can have the tensile modulus Ep and Ea of 1000 MPa or more.

$\alpha p$ and $\alpha a$ can be determined by, for example, using a thermomechanical analyzer, heating a sample piece cut out from the electrophotographic belt to a temperature 10° C. higher than the glass transition temperature of the conductive resin composition (crystalline polyester) used as the base layer at 5° C./min, holding the sample piece for 30 minutes, then cooling the sample piece to 25° C. at 5° C./min, and measuring the shrinkage ratio. The shrinkage ratio $\alpha p$ is preferably 2.0 to 10.0%, more preferably 3.0 to 8.0%, and still more preferably 3.5 to 7.0%. The shrinkage ratio $\alpha a$ is preferably 2.0 to 10.0%, more preferably 3.0 to 8.0%, and still more preferably 3.5 to 7.2%.

Further, by melt-extruding the conductive resin composition, the conductive resin composition can be processed into a film shape or a seamless belt shape to obtain a conductive film.

However, the thickness of the base layer is preferably 30 μm to 500 μm from the viewpoint of securing flexibility since the base layer is disposed in a bent state in the electrophotographic image forming apparatus. The thickness of the base layer is more preferably 40 to 100 μm.

The content of the conductive agent in the base layer is preferably 1 to 40 parts by mass, and more preferably 10 to 20 parts by mass with respect to 100 parts by mass of the crystalline polyester.

Conductive Layer

The conductive layer contains a crosslinked polyester urethane having a triazine ring structure in a molecule. The conductive layer is preferably a cured product of a conductive layer forming coating material. First, the conductive layer forming coating material will be described. The conductive layer forming coating material contains a polyester urethane and a melamine crosslinking agent, and if necessary, a conductive agent such as conductive particles. In addition, additives such as a catalyst, a plasticizer, a leveling agent, a decomposition inhibitor, a roughness modifier, and a filler can be added as necessary.

1. Polyester Urethane

The polyester urethane can be obtained, for example, by reacting a polyester polyol having an ester bond in the molecule and having hydroxy groups at both ends of the molecule with a diisocyanate.

The polyester polyol can be obtained by performing polycondensation of a dicarboxylic acid and a diol, polycondensation of an oxycarboxylic acid or a lactone, or polycondensation using a plurality of these components to give a hydroxy group to a terminal. The polyester polyol preferably has aromatics.

The diisocyanate is a compound in which two isocyanate groups are bonded to an aliphatic compound or an aromatic compound. Examples of those in which an isocyanate group is bonded to a linear aliphatic group include hexamethylene diisocyanate. Examples of those in which an isocyanate group is bonded to an aromatic group include 1,3-Bis (isocyanatomethyl)benzene. As the polyester urethane, a commercially available product may be used, and examples thereof include VYLON UR-1400 (trade name) manufactured by Toyobo Co., Ltd.

2. Melamine Crosslinking Agent

The crosslinked polyester urethane has a triazine ring structure in the molecule. The crosslinked polyester urethane has, for example, a structure in which a melamine crosslinking agent and a polyester urethane are crosslinked, and the melamine crosslinking agent can correspond to a triazine ring structure.

The melamine crosslinking agent is obtained by alkoxylating methylolmelamine produced by polycondensation of melamine and formaldehyde with an alcohol having 1 to 4 carbon atoms. The structural formula of melamine is shown in Formula (A) below. Melamine has a structure in which $NH_2$ is bonded to a triazine ring, and some or all of the six terminal hydrogen atoms react with formaldehyde. In order to function as a crosslinking agent, it is necessary that two or more hydrogen atoms react. The structural formula when all hydrogen atoms have reacted is shown in Formula (B) below.

Furthermore, by modifying a part or all of the methylol groups at the end of methylol melamine with alcohol, a structure in which an alkyl group is bonded to the end is obtained. In Formula (C) below, all methylol groups are modified with methanol. In the case of an alcohol, it is possible to modify the methylol group, but in the case of a long carbon chain, the crosslinking reaction hardly proceeds due to steric hindrance. Therefore, an alcohol having 1 to 4 carbon atoms is preferable.

In order to function as a crosslinking agent, it is necessary to modify two or more methylol groups. Various physical properties of the melamine crosslinking agent vary depending on the degree of methylol formation and the degree of alkoxylation. An appropriate melamine crosslinking agent may be selected according to desired physical properties, but is not particularly limited from the viewpoint of abrasion resistance, and two or more alkoxy groups that react with the polyester urethane may be present in the melamine crosslinking agent molecule. Examples of the melamine crosslinking agent include an alkylated melamine crosslinking agent, a methylol group-based melamine crosslinking agent, an imino group-based melamine crosslinking agent, a methylol/imino group-based melamine crosslinking agent, and a long chain alkylated melamine crosslinking agent.

By reacting the alkoxylated melamine with the polyester urethane, crosslinking proceeds. The linking moiety between the alkoxylated melamine and the polyester urethane has a structure as shown in Formula (D) below. However, Formula (D) below shows a structure in a case where three of six methoxy groups react.

(A)

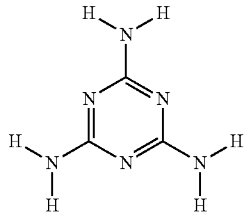

(B)

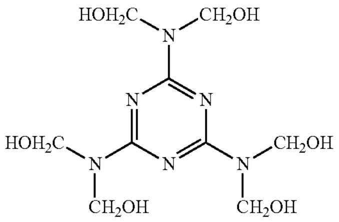

(C)

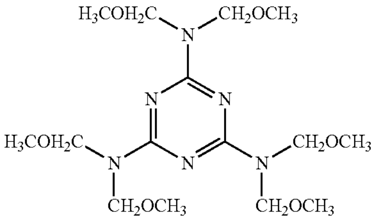

(D)

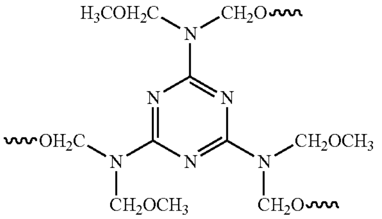

The crosslinked polyester urethane preferably has at least a structure represented by Formula (1) below. The following structure shows a triazine ring structure in the molecule. Therefore, the melamine crosslinking agent is preferably a crosslinking agent capable of forming a structure represented by Formula (1) below by reaction with the polyester urethane.

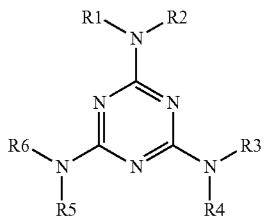
(1)

In the formula (1), R1 to R6 each independently represent any one selected from the group consisting of a hydrogen atom, *—$CH_2OH$, *—$CH_2OR7$, and *—$CH_2O$—**, provided that at least two of R1 to R6 are *—$CH_2O$—**, and R7 is a hydrogen atom or a linear or branched alkyl group having 1 to 4 (preferably 1 or 2, more preferably 1) carbon atoms.

The symbol "*" represents a bonding portion with a nitrogen atom that does not constitute a triazine ring in Formula (1), and the symbol "**" represents a bonding portion with the polyester urethane in the crosslinked polyester urethane. The bonding portion is a bonding portion with a molecular chain constituting at least a part of the polyester urethane.

In the structure represented by Formula (1), at least one selected from the group consisting of R1 and R2, and at least one selected from the group consisting of R3 and R4 are preferably *—$CH_2O$—**.

Further, in the structure represented by Formula (1), at least one selected from the group consisting of R1 and R2, at least one selected from the group consisting of R3 and R4, and at least one selected from the group consisting of R5 and R6 are more preferably *—$CH_2O$—**.

By *—$CH_2O$—**, a sufficient crosslinked structure may be formed, and abrasion resistance may be further improved.

The content of the melamine crosslinking agent in the conductive layer forming coating material is preferably 10 to 60 parts by mass, and more preferably 30 to 55 parts by mass with respect to 100 parts by mass of the polyester urethane.

The content ratio of the structure represented by Formula (1) in the crosslinked polyester urethane is preferably 7 to 40% by mass, and more preferably 20 to 35% by mass. When the content is within the above range, a sufficient crosslinked structure is formed, and abrasion resistance can be further improved.

3. Conductive Agent

The conductive layer may contain a conductive agent. The conductive agent preferably contains conductive particles. As the conductive particles, an electronic conductive agent can be used. The electron conductive agent includes, for example, at least one selected from the group consisting of carbon black, graphite, carbon nanotubes, carbon microcoils, graphene, zinc oxide, zinc antimonate, tin oxide, ITO (tin-doped indium oxide), and ATO (antimony-doped tin oxide). Among them, from the viewpoint of conductivity, the conductive layer preferably contains carbon black. In addition, in order to enhance the dispersion stability of carbon black in the coating material, a dispersing agent may be used.

As the preparation of the conductive layer forming coating material, it is preferable to dissolve or disperse the polyester urethane, the melamine crosslinking agent, and the conductive agent in at least one organic solvent selected from the group consisting of methyl ethyl ketone, isobutanol, methyl isobutyl ketone, toluene, and the like.

Formation of Conductive Layer

As a method for forming the conductive layer, the prepared conductive layer forming coating material is applied to the inner peripheral surface of the endless belt-shaped base layer. Examples of the application method include means such as spray coating, dip coating, ring coating, and roll coating. Thereafter, the solvent is removed by drying, and a conductive layer as a coating film can be formed.

After drying, a crosslinking process of crosslinking the polyester urethane and the melamine crosslinking agent in the conductive layer is performed. In the crosslinking process, for example, heating is performed at 150 to 190° C. for 10 seconds to 10 minutes (preferably 30 to 120 seconds). In the crosslinking step, it is preferable to perform pressurization simultaneously with heating. As described above, the shrinkage of the base layer containing the crystalline polyester is suppressed by pressurization, so that the coefficient of variation of the nanoindentation hardness can be easily controlled within the above range.

As a method and conditions for pressurization, it is only necessary to stretch molecules of the crystalline polyester in an amorphous state and suppress shrinkage, and a known method can be adopted. For example, it is preferable to pressurize with air. When the base layer was subjected to stretch blow molding, a method of applying an air pressure to the inside of a blow bottle that forms the base layer is exemplified. The pressure is preferably 0.05 to 0.3 MPa, more preferably 0.08 to 0.2 MPa in terms of gauge pressure.

Examples of the method for forming the conductive layer include the following. The conductive layer forming coating material is applied to the inside of the blow bottle obtained by the base layer forming method described above, and dried. The drying method is not particularly limited, but it is preferable to dry by heating (For example, 50 to 100° C., 1 to 10 minutes). After drying, a crosslinking process of applying air pressure under the conditions described above and heating under the conditions described above is performed inside the blow bottle having the conductive layer formed inside, thereby forming the conductive layer.

The surface resistivity at the time of application of 10 V measured on the outermost surface of the conductive layer, that is, the surface opposite to the surface facing the base layer of the conductive layer is preferably $1.0\times10^7\Omega/\square$ or less, more preferably $1.0\times10^6\Omega/\square$ or less. The lower limit of the surface resistivity is not particularly limited. When the surface resistivity is within the range, a primary transfer current equivalent to that of conventional primary transfer having a plurality of transfer power supplies can be supplied to each photosensitive drum.

The thickness of the conductive layer is preferably from 0.05 μm to 10 μm, more preferably from 0.1 μm to 5 μm, and still more preferably 0.5 μm to 2 μm from the viewpoint of bending resistance. In consideration of the above thickness, the polyester urethane is preferably one that can be dissolved in a solvent to form a thin layer containing the polyester urethane or a thin layer containing a polyester urethane raw material.

The arithmetic average value of the nanoindentation hardness in the observation region having the largest coefficient of variation among the eight observation regions is preferably 0.15 to 0.30 GPa and more preferably 0.21 to 0.29 GPa.

The standard deviation of the nanoindentation hardness in the observation region having the largest coefficient of variation among the 8 observation regions is preferably 0.00 to 0.08 GPa, and more preferably 0.00 to 0.05 GPa.

The coefficient of variation in the observation region having the largest coefficient of variation among the eight observation regions is preferably 0.00 to 0.20 and more preferably 0.00 to 0.19.

When the arithmetic mean value, the standard deviation, and the coefficient of variation are within the above ranges, cracks are more easily suppressed.

In addition, the arithmetic average value of the nanoindentation hardness, that is, the arithmetic average value of 128 points measured from eight observation regions is preferably 0.15 to 0.50 GPa, more preferably 0.15 to 0.30 GPa, and still more preferably 0.21 to 0.30 GPa.

By setting the average value of the nanoindentation hardness to 0.15 GPa or more, it is possible to further suppress the occurrence of physical deterioration such as wear due to rubbing with another sliding member (for example, a transfer roller or the like) mounted on the electrophotographic apparatus. The upper limit value of the average value of the nanoindentation hardness is not particularly limited, but when the average value is 0.50 GPa or less, physical damage to a sliding member mounted on a general electrophotographic apparatus is easily suppressed.

The nanoindentation hardness can be adjusted by, for example, the degree of crosslinking of the polyester urethane (before melamine crosslinking) or the degree of melamine crosslinking of the crosslinked polyester urethane. Specifically, for example, by using a polyfunctional isocyanate compound such as polymeric MDI as an isocyanate compound as a raw material of the polyester urethane, the nanoindentation hardness of the conductive layer can be increased by introducing a three-dimensional crosslinked structure into the polyester urethane. In addition, the nanoindentation hardness of the conductive layer can be increased by increasing the blending ratio of the melamine crosslinking agent used in the production of the crosslinked polyester urethane to the polyester urethane.

In addition, the standard deviation of the nanoindentation hardness is, for example, preferably 0.00 to 0.08, and more preferably 0.00 to 0.05.

Surface Layer (Outermost Layer)

A surface layer (outermost layer) in contact with the photosensitive drum or another member may be provided on the outer peripheral surface of the base layer. Examples of the surface layer include a layer having excellent abrasion resistance and containing a cured product of an active energy ray curable resin. Such a surface layer can be provided, for example, by applying a composition containing an active energy ray curable resin such as a photocurable resin on the outer peripheral surface of the base layer and curing the composition. As an example of the active energy ray curable resin, for example, an acrylic resin is suitably used. In addition, conductive particles may be added in order to adjust the surface resistivity of the surface layer. Examples of the conductive particles include carbon black, graphite, carbon nanotubes, carbon microcoils, zinc oxide, and zinc antimonate.

The electrophotographic belt has an endless shape.

The application of the electrophotographic belt according to the present disclosure is not limited to the intermediate transfer belt, and for example, the electrophotographic belt is suitably used for a conveyance transfer belt or the like. The electrophotographic belt may be an intermediate transfer belt or a conveyance transfer belt.

Electrophotographic Image Forming Apparatus

An electrophotographic image forming apparatus according to the present disclosure will be described more specifically with reference to FIGS. 2A and 2B. The electrophotographic image forming apparatus includes an image forming unit 205*a* that forms a yellow image, an image forming unit 205*b* that forms a magenta image, an image forming unit 205*c* that forms a cyan image, and an image forming unit 205*d* that forms a black image. The image forming unit 205*a* will be described in detail below as an example.

Figure 2A:
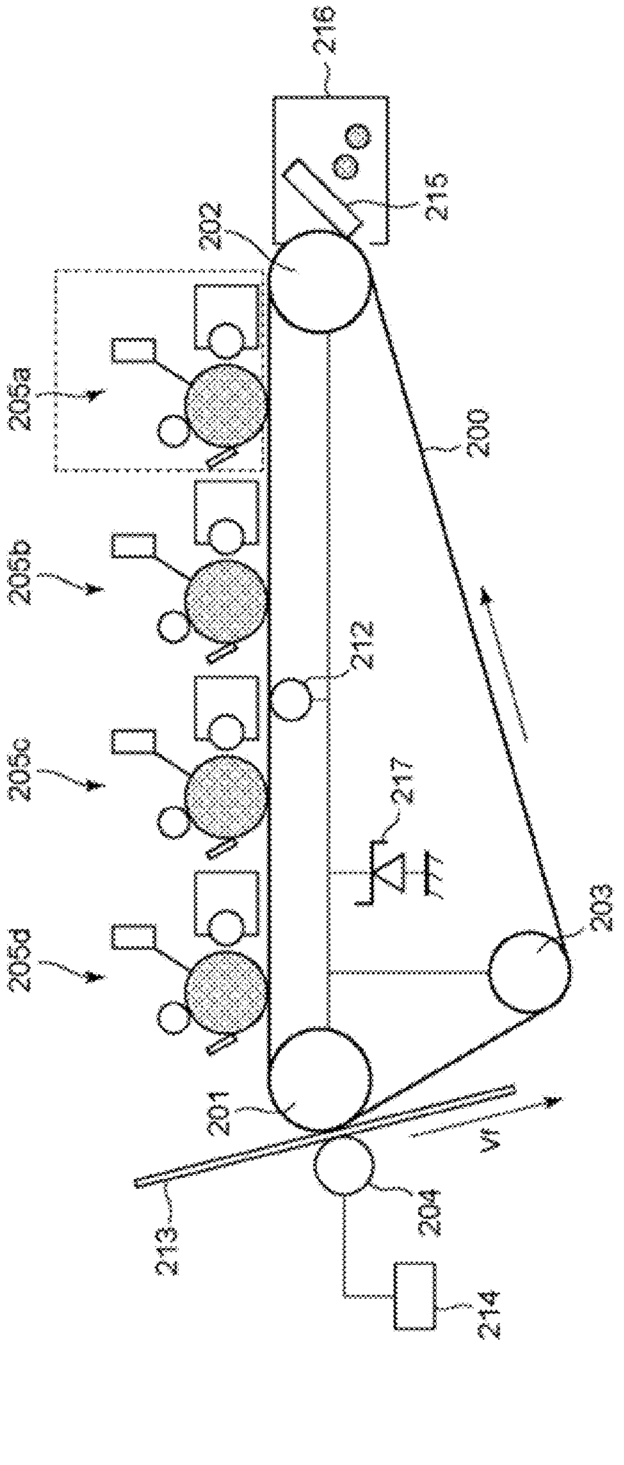
FIGS. 2A and 2B are schematic views of an electrophotographic image forming apparatus according to the present disclosure.
Figure 2B:
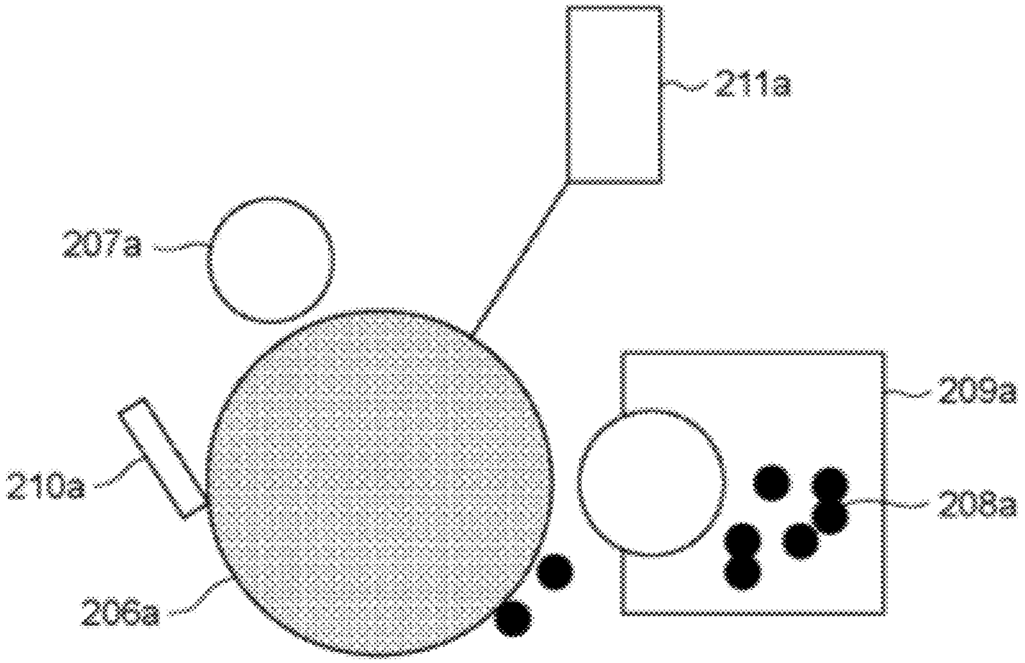

FIG. 2B is an enlarged schematic view of the image forming unit 205*a*. The image forming unit 205*a* includes a photosensitive drum 206*a* as an Image bearing member, and is rotationally driven at a predetermined process speed. A charging roller 207*a* as a charging member, a developing member 209*a* storing toner 208*a*, and a drum cleaning member 210*a* are installed around the photosensitive drum 206*a*. Further, an exposure member 211*a* is disposed around the photosensitive drum 206*a* between the charging roller 207*a* and the developing member 209*a*.

The photosensitive drum 206*a* is charged by the charging roller 207*a*, and the charged electrostatic charge image bearing member is exposed by the exposure member 211*a* to form an electrostatic latent image (toner image). Thereafter, the electrostatic latent image is developed by the toner 208*a* triboelectrically charged in the developing member 209*a*, and is transferred to an intermediate transfer belt 200 installed at a position facing each image forming unit by the primary transfer voltage (Hereinafter, referred to as "primary transfer").

Similarly, in the image forming units 205*b*, 205*c*, and 205*d*, primary transfer is performed in synchronization with the rotation of the intermediate transfer belt 200, and a toner composite image of four colors is formed. At this time, it is preferable that one or more metal rollers 212, which are primary transfer opposing members, are provided between the image forming units 205*b* and 205*c* at positions facing the image forming unit via the intermediate transfer belt 200. By forming the primary transfer portion by the metal roller 212 that presses the intermediate transfer belt 200 against the opposing image forming unit, the width (nip) of the primary transfer portion can be widened and stabilized.

The recording medium 213 such as paper is supplied to a position downstream of the position of the fourth image forming unit 205*d* on the intermediate transfer belt 200. A secondary transfer roller 204 (secondary transfer member) is disposed at the same position. The gap formed by the intermediate transfer belt 200 and the secondary transfer roller 204 and the vicinity thereof where the toner image on the intermediate transfer belt 200 is transferred to the recording medium are referred to as a secondary transfer portion. Reference numeral 203 represents a tension roller.

As illustrated in FIG. 2A, the secondary transfer portion is preferably configured to include a nip between the secondary transfer roller 204 and the driver roller and secondary transfer counter roller 201. When the non-image portion immediately before the toner composite image formed on the intermediate transfer belt 200 reaches the secondary transfer portion, a voltage having a polarity opposite to that of the toner is applied from a voltage power supply 214 that supplies a current to the secondary transfer roller 204. Then, when the recording medium 213 passes through the secondary transfer portion in the direction of the arrow Vf in FIG. 2A, the toner composite images of the four colors on the intermediate transfer belt 200 are collectively transferred onto the recording medium 213. This transfer is referred to as "secondary transfer."

The recording medium 213 subjected to the secondary transfer is subjected to a fixing process by a fixing unit (not illustrated) to become a color image. On the other hand, the toner remaining on the intermediate transfer belt 200 without being secondarily transferred is scraped off by the cleaning blade 215 contacting on the surface of the belt on which the tension roller 202 is disposed at an arbitrary timing, and is collected in the waste toner box 216. In this manner, the surface of the intermediate transfer belt 200 returns to the initial state.

In the electrophotographic image forming apparatus according to the present disclosure, in addition to the transfer voltage necessary for the secondary transfer, the transfer voltage necessary for the primary transfer is also obtained from the voltage power supply 214. The intermediate transfer belt 200 includes, for example, a conductive layer on an inner peripheral surface of the belt. The electrophotographic image forming apparatus preferably includes the electrophotographic belt according to the present disclosure as an intermediate transfer belt.

As illustrated in FIG. 2A, a metal roller 212 in contact with the inner peripheral surface of the intermediate transfer belt is connected to a Zener diode 217 that is a constant voltage element and is grounded. Therefore, the potential of the conductive layer of the intermediate transfer belt becomes constant in the circumferential direction by the voltage applied from the voltage power supply 214. As a result, the potential difference between the photosensitive drum and the intermediate transfer belt in each of the image forming units 205*a*, 205*b*, 205*c*, and 205*d* becomes substantially equal, the current flowing to each photosensitive drum also becomes substantially equal, and primary transfer becomes possible. Note that, since the resistance value of the recording medium itself changes due to environmental fluctuations such as temperature and humidity at the time of image formation, the secondary transfer voltage is preferably changed within a certain range.

In the electrophotographic image forming apparatus according to the present disclosure, even in a case where the fluctuation of the secondary transfer voltage, for example, the secondary transfer voltage further increases, a current flows when the Zener potential is exceeded because the Zener diode 217 is connected. As a result, the potential of the conductive layer can be kept constant, and the primary transferability can be stabilized. Specifically, the applied voltage of the voltage power supply 214 is preferably 1000 to 3500 V, and the Zener potential is preferably 220 to 300 V. According to the present disclosure, by having the transfer configuration, the primary transfer and the secondary transfer can be stably performed by one transfer power supply.

According to one aspect of the present disclosure, it is possible to obtain an electrophotographic belt capable of stably forming a high-quality electrophotographic image even when the electrophotographic belt is applied to an electrophotographic image forming apparatus in which the number of power sources for transfer is reduced. In addition, according to another aspect of the present disclosure, it is possible to obtain an electrophotographic image forming apparatus capable of stably forming a high-quality electrophotographic image even when the number of power sources for transfer is reduced.

EXAMPLES

Hereinafter, the present disclosure will be specifically described with reference to examples and comparative examples, but the present disclosure is not limited thereto.

Materials used for producing electrophotographic belts according to examples and comparative examples are shown below.

TABLE 1

| Abbreviated Name | Material name, Product name, etc |
|---|---|
| Crystalline polyester | Polyethylene naphthalate<br>"8050SC" (Product name, manufactured by TEIJIN LIMITED.) |
| Ionic conducting agent A | Tributylmethylammonium bis(trifluoromethanesulfonyl)imide<br>"FC-4400" (Product name, manufactured by 3M) |
| Ionic conducting agent B | Polyetheresteramide<br>"TPAE-H151" (Product name, manufactured by T&K TOKA Corporation) |
| Polyester urethane | Methyl ethyl ketone solution of polyester urethane<br>"VYLON UR-1400" (manufactured by TOYOBO CO., LTD.)<br>Solvent ingredient amount 70% by mass<br>Resin ingredient amount 30% by mass |
| Melamine A | Alkylated melamine crosslinking agent<br>"CYMEL300" (Product name, manufactured by Allnex Japan Inc.)<br>Solvent ingredient amount 2% by mass<br>Melamine crosslinking agent ingredient amount 98% by mass |
| Melamine B | Isobutanol solution of methylol group-based melamine crosslinking agent<br>"CYMEL370" (Product name, manufactured by Allnex Japan Inc.)<br>Solvent ingredient amount 15.5% by mass<br>Melamine crosslinking agent ingredient amount 84.5% by mass |
| Melamine C | Isobutanol solution of imino group-based melamine crosslinking agent<br>"CYMEL325" (Product name, manufactured by Allnex Japan Inc.)<br>Solvent ingredient amount 22.5% by mass<br>Melamine crosslinking agent ingredient amount 77.5% by mass |
| Melamine D | Isobutanol solution of methylol/imino group-based melamine crosslinking agent<br>"CYMEL701" (Product name, manufactured by Allnex Japan Inc.)<br>Solvent ingredient amount 18% by mass<br>Melamine crosslinking agent ingredient amount 82% by mass |

TABLE 1-continued

| Abbreviated Name | Material name, Product name, etc |
|---|---|
| Melamine E | Long chain alkylated melamine crosslinking agent<br>"CYMEL232" (Product name, manufactured by Allnex Japan Inc.)<br>Solvent ingredient amount 3% by mass<br>Melamine crosslinking agent ingredient amount 97% by mass |
| Conductive agent | Carbon black dispersion<br>"MHI Black #273" (Product name, manufactured by MIKUNI COLOR LTD)<br>Solvent ingredient amount 85% by mass<br>Solid content 15% by mass |
| Additive 1 | Silicone-based graft polymer<br>"Cimac US-270" (Product name, manufactured by TOAGOSEI CO., LTD.)<br>Solvent ingredient amount 71% by mass<br>Resin ingredient amount 29% by mass |
| Additive 2 | Acrylic resin<br>"ARUFON UC-3000" (Product name, manufactured by TOAGOSEI CO., LTD.)<br>Resin ingredient amount 100% by mass |
| Solvent | Methyl Ethyl Ketone Special grade manufactured by KISHIDA CHEMICAL Co., Ltd. |

Hereinafter, a measurement method and an evaluation method used in each example will be described.

Evaluation 0: Confirmation of Crosslinked Polyester Urethane in Conductive Layer The presence of a peak at 1720 $cm^{-1}$ attributed to C═O stretching, a broad peak at 3300 to 3500 $cm^{-1}$ attributed to O—H stretching and N—H stretching, and a peak around 720 $cm^{-1}$ attributed to a benzene ring was confirmed.

Evaluation 1: Confirmation of Presence or Absence of Aromatic Ring (Benzene Ring), Polyester Urethane, and Triazine Ring in Crosslinked Polyester Urethane in Conductive Layer;

For a 1 cm square sample collected from the conductive layer, an IR spectrum in a wave number range of 630 to 4000 $cm^{-1}$ was measured using a Fourier transform infrared spectrometer (Frontier MIR/NIR+Spotlight400) (Trade name: manufactured by PerkinElmer, Inc.). The measurement conditions were as follows using an ATR method (using diamond crystals): measurement area: φ3 mm, wavenumber resolution: 4 $cm^{-1}$, number of integrations: 16 times.

Then, from the obtained IR spectrum chart, there is confirmed the presence or absence of the following:

i) a peak at 1720 $cm^{-1}$ attributed to C═O stretching, ii) a broad peak appearing at 3300 to 3500 $cm^{-1}$ assigned to O—H stretching and N—H stretching, iii) a peak appearing around 720 $cm^{-1}$ assigned to a benzene ring; and iv) a peak at 815 $cm^{-1}$ assigned to the triazine ring.

The presence or absence of each peak according to the above i) to iv) is described in Table 3.

Evaluation 2: Measurement of Nanoindentation Hardness

The hardness of the conductive layer was measured using a micro indentation hardness tester (Nanoindenter G200, manufactured by TOYO Corporation). A surface of the conductive layer opposite to a surface facing the base layer was measured. The measurement temperature was 25° C., and a Berkovich indenter made of diamond was used as the indenter. As a measurement method, a continuous rigidity measurement method was employed, and data of hardness at a depth of 50 nm from the outer surface of the conductive layer was used for analysis.

A square sample of 5 mm square was cut out from the conductive layer with a razor at eight locations (see FIG. 3) in the circumferential direction in the central region of the electrophotographic belt. Each sample was cut out such that one side was parallel to the circumferential direction of the electrophotographic belt. One 2.5 mm square observation region was placed on the surface corresponding to the outer surface of the conductive layer of each sample. The observation region was placed such that one side was parallel to one side of the sample.

Then, the observation region was divided equally by four straight lines parallel to one side of the observation region and four straight lines orthogonal to the straight lines, and the nanoindentation hardness was measured at 16 intersection points of these straight lines. The arithmetic mean value and standard deviation of the hardness data at 16 points were determined, and the coefficient of variation was calculated. The coefficient of variation was calculated by dividing the standard deviation by the average value. Then, the number of samples having a coefficient of variation of 0.25 or less was determined and described in Table 3 (the number of observation regions satisfying the condition/8).

In Examples 1 to 8 and Reference Example 1, the arithmetic mean value, standard deviation, and coefficient of variation of the observation region having the largest coefficient of variation among the eight observation regions are shown in Table 3. On the other hand, in Comparative Examples 1 and 2, the average value, the standard deviation, and the coefficient of variation of the observation region having the smallest coefficient of variation among the eight observation regions are shown in Table 3.

Further, the arithmetic average value of the nanoindentation hardness at 128 points measured from 8 observation regions is described in Table 3 as the average value (overall average value) of the nanoindentation hardness of the entire conductive layer.

Evaluation 3: Evaluation of Shrinkage Ratio

As an index of the shrinkage stress of the electrophotographic belt, the shrinkage ratio was measured by the following method. The shrinkage ratio was measured using a thermomechanical analyzer (TMA/SDTA841 type, manufactured by Mettler Toledo) under the following measurement conditions with a change in distance between chucks as a dimensional change of the sample. Sample pieces of 5 mm in the member circumferential direction×20 mm in the axial direction and 20 mm in the member axial direction×5 mm in the circumferential direction were cut out from the electrophotographic belt and used.

The sample piece was held at a distance between chucks of 10 mm and a load of 0.01 N, held at 25° C. for 10 minutes, heated to a temperature 10° C. higher than the glass transition temperature of the conductive resin composition (crystalline polyester) used for the base layer at 5° C./min, held for 30 minutes, and then cooled to 25° C. at 5° C./min.

The glass transition temperature was measured using a differential scanning calorimeter (DSC3+, manufactured by Mettler Toledo). 10 mg of a sample was cut out from the base layer, and the sample was heated from 25° C. to 280° C. at a heating rate of 10° C./min in a nitrogen atmosphere. In the obtained spectrum, the intermediate temperature between the temperature at which the baseline starts to shift and the temperature at which the baseline ends to shift was defined as the glass transition temperature.

When the distance between chucks before the temperature rise was x1 and the distance between chucks at the end was x2, the shrinkage ratio α (unit: %) was calculated by the following formula.

$$\alpha=(x1-x2)/x1\times100$$

An arithmetic average value was obtained from the measurement results of five sample pieces each cut out from the same electrophotographic belt, and the shrinkage ratio in the circumferential direction of the electrophotographic belt was defined as αp, and the shrinkage ratio in the direction orthogonal to the circumferential direction was defined as αa. The respective values are described in Table 3.

Evaluation 4: MIT Test

As an evaluation of durability, an MIT test was performed. The sample was cut out from the electrophotographic belt with scissors to be 20 mm in the axial direction and 100 mm in the circumferential direction. This was bent 600,000 times using an MIT type folding endurance tester (No. 307 MIT folding resistance tester manufactured by YASUDA SEIKI MFG. CO., LTD.). The radius of curvature of the clamp was 4 mm, the bending speed was 180 times/min, the bending angle was 135° on the left and right, and the tensile load was 1 kg. After completion of the MIT test, a bent portion of the conductive layer was observed with a microscope (VHX 100 F, manufactured by KEYENCE CORPORATION). The presence or absence of cracks of 1 mm or more was confirmed, and the evaluation was performed according to the following criteria.

Rank A: 0 cracks of 1 mm or more

Rank B: 1 to 3 cracks of 1 mm or more

Rank C: 4 or more cracks of 1 mm or more

Evaluation 5: Image Quality Evaluation

Using the obtained electrophotographic belt as an intermediate transfer belt of an electrophotographic image forming apparatus having the configuration shown in FIGS. 2A and 2B, an electrophotographic image was formed to confirm the presence or absence of an image defect caused by a crack in a conductive layer as an inner surface layer. Plain paper (Trade name: Business4200, Xerox Corporation, basis weight: 75 g/$m^2$) of a letter size (width: 216 mm) was used as paper, and an image of a secondary color obtained by superimposing solid images of two colors of toners output in a single-sided print mode was used as a print mode.

Here, the secondary color image is an image having an average density of 200% of red (R), green (G), and blue (B). The output image was evaluated according to the following criteria. After 300,000 sheets were also output, the electrophotographic belt was taken out from the electrophotographic image forming apparatus, and the surface of the conductive layer was observed with a loupe at a magnification of 20 times. Then, the presence or absence of occurrence of cracks in the conductive layer and the output image were evaluated according to the following criteria.

Rank A: No defect occurred in the image in the process of outputting 300,000 sheets, and no crack of 1 mm or more was confirmed.

Rank B: No defect occurred in the image in the process of outputting 300,000 sheets, but 1 to 3 cracks of 1 mm or more were confirmed at the end.

Rank C: A defect occurred in the image in the process of outputting 300,000 sheets, and 4 or more cracks of 1 mm or more were confirmed.

Measurement of Thickness of Base Layer

Using a film thickness measuring device (MS-11C, manufactured by Nikon Solutions Co., Ltd.), measurement points were provided at two points in the axial direction and four points in the circumferential direction of the electrophotographic belt, and the thickness of the base layer was measured. The arithmetic average value of all the measured values at 8 points was determined and taken as the thickness of the base layer.

Example 1

Production of Coating Material for Forming Conductive Layer

VYLON UR-1400 used as the polyester urethane also contains methyl ethyl ketone as a solvent in addition to the polyester urethane as a resin component. A melamine crosslinking agent, MHI-black #273 used as a conductive agent, and SYMAC US-270 of Additive 1 contain isobutanol or methyl ethyl ketone as a solvent in addition to the melamine crosslinking agent, carbon black, and silicone-based graft polymer as main components. On the other hand, Additive 2, ARUFON UC-3000, which is solid, was dissolved in the same amount of methyl ethyl ketone as ARUFON UC-3000 prior to coating material formulation.

The resin component in the polyester urethane and the melamine crosslinking agent component in the melamine A were mixed at a mass ratio of 20:9. Additive 1 and Additive 2 were added thereto, and methyl ethyl ketone was added thereto to adjust the viscosity.

Further, MHI black #273 was added as a conductive agent, and the mixture was stirred for 1 hour. The numerical values described in Table 2 indicate the mass of the resin component calculated from the mass of the blended raw material. In addition, the blending amounts of the conductive agent and the additive were adjusted so that the carbon black was 23 g in 1 kg of the coating material, the additive 1 was 2 g in 1 kg of the coating material, and the additive 2 was 12.5 g in 1 kg of the coating material. In addition, the blending amount of methyl ethyl ketone was adjusted so that the entire coating material was 1 kg.

Production of Preform

The crystalline polyester (83.7 parts by mass), the ionic conducting agent A (1.3 parts by mass), and the ionic conducting agent B (15 parts by mass) were hot-melt-kneaded. Each sample was charged into a twin screw extruder (Trade name: TEX30α, manufactured by The Japan Steel Works, Ltd.), the temperature was adjusted to 270° C., and kneading was performed under the condition of a kneading time of 5 minutes. The obtained resin mixture was pelletized.

The resulting resin mixture was then dried at a temperature of 140° C. for 6 hours. Using this pellet, a preform was prepared using an injection molding apparatus (Trade name: SE180EV-A, manufactured by Sumitomo Heavy Industries, Ltd.) in which the cylinder set temperature was 300° C. The injection molding mold temperature at this time was 30° C. The obtained preform had a test tube shape with an outer diameter of 50 mm, an inner diameter of 46 mm, and a length of 150 mm.

Biaxial Stretching Molding

The obtained preform was put into a blow molding machine, and blow-molded at a preform temperature of 155° C., an air pressure of 0.3 MPa, and a stretching bar speed of 1000 mm/s using a stretching bar and an air force in a blow mold in which the mold temperature was maintained at 110° C. to obtain a blow bottle.

Formation of Conductive Layer

The conductive layer forming coating material was uniformly sprayed to the inside of the obtained blow bottle by a spraying method, and dried at 70° C. for 5 minutes. The spraying amount was adjusted so that the thickness of the conductive layer was 1 μm.

Crosslinking of Polyester Urethane and Melamine Crosslinking Agent

A blow bottle having a conductive layer formed inside was set in a cylindrical mold made of nickel. An air pressure of 0.1 MPa was applied to the inside of the blow bottle to adjust the air not to leak to the outside, thereby bringing the blow bottle into close contact with the inner peripheral surface of the nickel cylindrical mold. Further, while rotating the nickel cylindrical mold, the outer peripheral surface of the nickel cylindrical mold was heated to 190° C. with a heater and uniformly heated for a total of 60 seconds to crosslink the polyester urethane and the melamine crosslinking agent. Thereafter, the nickel cylindrical mold was cooled to 25° C. by blowing air at a temperature of 25° C. to release the pressure of the air applied in the blow bottle.

Both ends of the obtained blow bottle were cut with a laser to obtain an electrophotographic belt having a circumferential length of 630 mm, a width of 250 mm, and a thickness of 66 μm.

Examples 2 to 5

An electrophotographic belt was produced and evaluated in the same manner as in Example 1 except that the type of the melamine crosslinking agent was changed as described in Table 2 below.

Examples 6 and 7

An electrophotographic belt was produced and evaluated in the same manner as in Example 1 except that the thickness of the base layer was changed as described in the following Table 2.

Example 8

An electrophotographic belt was produced and evaluated in the same manner as in Example 1 except that the amount of the melamine crosslinking agent was changed as described in Table 2.

Reference Example 1 and Comparative Examples 1 and 2

An electrophotographic belt was produced and evaluated in the same manner as in Example 1 except that the material type and the blending amount were changed as described in the following Table 2. The evaluation results are shown in Table 3.

Reference Example 1 is a case where a melamine crosslinking agent is not contained. Since the crosslinking reaction of the polyester urethane did not occur, it is considered that the nanoindentation hardness was lower than that in Example 1.

In Comparative Example 1, no pressure was applied in the crosslinking reaction of the melamine crosslinking agent and the polyester urethane. Therefore, it is considered that the base layer shrank due to heat in the process of forming the conductive layer, a density difference of the resin occurred inside the obtained conductive layer, and the coefficient of variation of the nanoindentation hardness increased. Then, it is considered that a crack occurred in the conductive layer in the MIT test due to the presence of a portion having a large hardness difference in the conductive layer. In Comparative Example 1, since the base layer shrank in the process of forming the conductive layer, as the evaluation result of the shrinkage ratio, αp and αa were 2.0% or less.

Comparative Example 2 is a case where a base layer having a thickness of 40 μm is used, and pressure is not applied when a crosslinking reaction between a melamine crosslinking agent and a polyester urethane is performed. As in Comparative Example 1, the coefficient of variation in the nanoindentation hardness was larger than that in Example 6. Therefore, it is considered that a crack was confirmed in the observation after the MIT test. In addition, the shrinkage ratio was also small.

TABLE 2

| | | Polyester urethane (parts by mass) | Melamines | Melamine crosslinking agent blending amount (parts by mass) | Base layer thickness (μm) | Pressure force (MPa) |
|---|---|---|---|---|---|---|
| Examples | 1 | 100 | A | 45 | 65 | 0.1 |
| | 2 | 100 | B | 45 | 65 | 0.1 |
| | 3 | 100 | C | 45 | 65 | 0.1 |
| | 4 | 100 | D | 45 | 65 | 0.1 |
| | 5 | 100 | E | 45 | 65 | 0.1 |
| | 6 | 100 | A | 45 | 40 | 0.1 |
| | 7 | 100 | A | 45 | 100 | 0.1 |
| | 8 | 100 | A | 10 | 65 | 0.1 |
| Comparative | 1 | 100 | A | 45 | 65 | 0 |
| Examples | 2 | 100 | A | 45 | 40 | 0 |
| Reference Example 1 | | 100 | Not used | 0 | 65 | 0.1 |

TABLE 3

| | | Evaluation | | | | | | | | | | | | |
|---|---|---|---|---|---|---|---|---|---|---|---|---|---|---|
| | | 1 | | | | 2 | | | | | 3 | | | |
| | | Peak i) | Peak ii) | Peak iii) | Peak iv) | Number of observation regions satisfying conditions/8 | Average value (GPa) | Standard deviation (GPa) | Coefficient of variation | Entire average value (GPa) | $\alpha^p$ (%) | $\alpha^a$ (%) | 4 Rank | 5 Rank |
| Examples | 1 | Present | Present | Present | Present | 8/8 | 0.28 | 0.03 | 0.11 | 0.29 | 5.2 | 5.3 | A | A |
| | 2 | Present | Present | Present | Present | 8/8 | 0.25 | 0.03 | 0.12 | 0.27 | 5.1 | 5.3 | A | A |
| | 3 | Present | Present | Present | Present | 8/8 | 0.22 | 0.04 | 0.18 | 0.24 | 5.4 | 5.0 | A | A |
| | 4 | Present | Present | Present | Present | 8/8 | 0.23 | 0.04 | 0.17 | 0.25 | 5.3 | 5.0 | A | A |
| | 5 | Present | Present | Present | Present | 8/8 | 0.20 | 0.05 | 0.25 | 0.21 | 5.0 | 5.2 | B | B |
| | 6 | Present | Present | Present | Present | 8/8 | 0.28 | 0.02 | 0.07 | 0.30 | 6.9 | 7.1 | A | A |
| | 7 | Present | Present | Present | Present | 8/8 | 0.27 | 0.05 | 0.19 | 0.28 | 3.8 | 3.9 | A | A |
| | 8 | Present | Present | Present | Present | 8/8 | 0.15 | 0.03 | 0.20 | 0.17 | 5.2 | 5.4 | B | B |
| Reference Example | 1 | Present | Present | Present | Absence | 8/8 | 0.11 | 0.02 | 0.18 | 0.13 | 5.3 | 5.2 | — | — |
| Comparative | 1 | Present | Present | Present | Present | 0/8 | 0.36 | 0.11 | 0.31 | 0.30 | 1.5 | 1.4 | C | C |
| Examples | 2 | Present | Present | Present | Present | 0/8 | 0.38 | 0.13 | 0.34 | 0.33 | 1.1 | 1.2 | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-150497, filed Sep. 15, 2023, which is hereby incorporated by reference herein in its entirety.

What is claimed is:

1. An electrophotographic belt having an endless shape, the electrophotographic belt comprising:

a base layer having an endless shape; and a conductive layer in contact with the base layer, wherein the base layer comprises a crystalline polyester, the conductive layer comprises a crosslinked polyester urethane, the crosslinked polyester urethane has a triazine ring in a molecule, and when a length in a width direction orthogonal to a circumferential direction of the electrophotographic belt is W, and a region of W/4 from a midpoint in the width direction toward both ends in the width direction is a central region, when eight observation regions of a square having a side length of 2.5 mm are placed in the circumferential direction of the electrophotographic belt in the central region of an outer surface of the conductive layer opposite to a surface facing the base layer such that one side of the square is parallel to the width direction, at least six of the eight observation regions satisfy conditions:

when the observation region is divided equally by four straight lines parallel to one side of the observation region and four straight lines orthogonal to the straight lines, at 16 intersection points of these straight lines, a coefficient of variation of the nanoindentation hardness measured under an environment at a temperature of 25° C. is not more than 0.25.

2. The electrophotographic belt according to claim 1, wherein an average value of the nanoindentation hardness is 0.15 to 0.30 GPa.

3. The electrophotographic belt according to claim 1, wherein the crosslinked polyester urethane has at least a structure represented by formula (1):

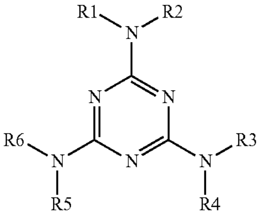

(1)

wherein in the formula (1),

R1 to R6 each independently represent any one selected from the group consisting of a hydrogen atom, $*—CH_2OH$, $*—CH_2OR7$, and $*—CH_2O—**$, provided that at least two of R1 to R6 are $*—CH_2O—**$;

R7 is a hydrogen atom or a linear or branched alkyl group having 1 to 4 carbon atoms, symbol "*" represents a bonding portion with a nitrogen atom that does not constitute a triazine ring in the formula (1), and symbol "**" represents a bonding portion with polyester urethane in the crosslinked polyester urethane.

4. The electrophotographic belt according to claim 3, wherein in the structure represented by the formula (1), at least one selected from the group consisting of R1 and R2, and at least one selected from the group consisting of R3 and R4 is $*—CH_2O—**$.

5. The electrophotographic belt according to claim 3, wherein in the structure represented by the formula (1), at least one selected from the group consisting of R1 and R2, at least one selected from the group consisting of R3 and R4, and at least one selected from the group consisting of R5 and R6 is $—*—CH_2O—**$.

6. The electrophotographic belt according to claim 1, wherein the crystalline polyester contains at least one selected from the group consisting of polyethylene terephthalate and polyethylene naphthalate.

7. The electrophotographic belt according to claim 1, wherein a thickness of the base layer is 40 to 100 μm.

8. The electrophotographic belt according to claim 1, wherein when a sample piece cut out from the electrophotographic belt is heated to a temperature 10° C. higher than a glass transition temperature of the crystalline polyester at 5° C./min, and held at this temperature for 30 minutes, and then cooled to 25° C. at 5° C./min using a thermomechanical analyzer to measure a shrinkage ratio, a shrinkage ratio αp of the electrophotographic belt in the circumferential direction is at least 2.0%, and a shrinkage ratio αa of the electrophotographic belt in a direction orthogonal to the circumferential direction is at least 2.0%.

9. The electrophotographic belt according to claim 1, wherein the conductive layer is present on an inner peripheral surface side of the base layer.

10. The electrophotographic belt according to claim 1, wherein the electrophotographic belt is an intermediate transfer belt.

11. An electrophotographic image forming apparatus, comprising the electrophotographic belt according to claim 1 as an intermediate transfer belt.

* * * * *